(12) United States Patent
Kreye

(10) Patent No.: US 6,709,614 B1
(45) Date of Patent: Mar. 23, 2004

(54) METHOD FOR PRODUCING A CONNECTION BETWEEN A COMPONENT AND A STRUCTURAL ELEMENT

(75) Inventor: Bernhard Kreye, Wunstorf (DE)

(73) Assignee: Henniges Elastomer- und Kunststofftechnik GmbH & Co. KG, Rehburg-Loccum (DE)

( * ) Notice: Subject to any disclaimer, the term of this patent is extended or adjusted under 35 U.S.C. 154(b) by 0 days.

(21) Appl. No.: 09/367,957

(22) PCT Filed: Jan. 5, 1999

(86) PCT No.: PCT/DE99/00009

§ 371 (c)(1),
(2), (4) Date: Aug. 26, 1999

(87) PCT Pub. No.: WO99/34966

PCT Pub. Date: Jul. 15, 1999

(30) Foreign Application Priority Data

Jan. 7, 1998 (DE) .......................... 198 00 282

(51) Int. Cl.⁷ .................. B29C 39/10; B29C 47/02
(52) U.S. Cl. .................. 264/135; 264/263; 264/274
(58) Field of Search .................. 264/135, 274, 264/261, 263; 156/71, 108; 296/146.15

(56) References Cited

U.S. PATENT DOCUMENTS

| 4,481,160 | A | * | 11/1984 | Bree | 264/135 |
| 5,073,324 | A | * | 12/1991 | Beaudet | 264/255 |
| 5,527,083 | A | * | 6/1996 | Kreye | 296/146.15 |
| 5,778,571 | A | * | 7/1998 | Pasqualini et al. | 37/455 |
| 6,086,695 | A | * | 7/2000 | Kreye | 156/108 |
| 6,099,779 | A | * | 8/2000 | Brandner et al. | 264/242 |

FOREIGN PATENT DOCUMENTS

| DE | 16 04 736 | | 1/1971 |
| DE | 33 41 926 | | 1/1985 |
| DE | 37 42 719 | | 7/1989 |
| DE | 41 08 219 | | 9/1992 |
| DE | 43 26 013 | | 2/1995 |
| EP | 0 014 247 | | 8/1980 |
| EP | 0 158 046 | | 10/1985 |
| EP | 0368817 A2 | * | 5/1990 |
| EP | 0 368 817 | | 5/1990 |
| EP | 0 614 775 | | 9/1994 |
| EP | 0 633 128 | | 1/1995 |
| EP | 0 707 993 | | 4/1996 |
| EP | 0 845 347 | | 6/1998 |
| EP | 0 863 035 | | 9/1998 |
| FR | 2 157 189 | | 6/1973 |
| FR | 2 627 555 | | 8/1989 |
| FR | 2 649 145 | | 1/1991 |
| GB | 2 245 300 | | 1/1992 |
| JP | 403283552 A | * | 12/1991 |

* cited by examiner

Primary Examiner—Edmund H. Lee
(74) Attorney, Agent, or Firm—Collard & Roe, P.C.

(57) ABSTRACT

A process for producing a connection of a structural component having at least one holding element, with a structural element, provision is made that on a surface of the structural element located in the zone of connection, at least one intermediate holding means is formed by means of an adhesive and curing pourable compound, such intermediate holding means being engageable with at least one holding element of the structural component in an actively holding joint. This method permits producing at favorable cost a connection which can be detached again at low labor expenditure.

5 Claims, 3 Drawing Sheets

METHOD FOR PRODUCING A CONNECTION BETWEEN A COMPONENT AND A STRUCTURAL ELEMENT

The invention relates to a method of producing a connection of a structural component having at least one retaining element, with a structural element.

Commonly employed methods for joining parts comprise detachable connections, on the one hand, and the group of undetachable joints, on the other. Basically, undetachable joints are actually detachable as well, though only with considerable expenditure. However, if such an undetachable connection is, for example a welded joint or a riveted connection, such detachmant leads to complete destruction of the joints and, in most cases, to mechanical damage of the zones where the components were joined before.

Detachable connections, which are in most cases screw connections or clamped joints or the like, are labor- and consequently cost-intensiveboth in regard to their manufacture and installation and particularly in dismantling work when the connecting means need to be removed.

The invention is based on the problem of producing at favorable cost a connection that can be detached again at low labor expenditure.

Said problem is solved according to the invention in that at least one intermediate holding means is formed by means of an adhesive and curing, pourable compound on a surface disposed in the zone of connection, such intermediate holding means being engageable in an actively holding connection with at least one holding element of the structural component.

It is a special feature of the method specified herein that the structural component is not directly joined with the structural element, but rather connected with the latter via the intermediate holding means, whereby the latter is formed on site in a way essential to the invention, i.e., in the zone of connection by pouring, pressing or injecting of the liquid, curing pourable compound.

The present method may be implemented by employing the following procedure: The structural component is placed against the structural element in a predetermined position and subsequently caused to participate in the development of the intermediate holding means made of pourable compound, i.e., by participating in the shaping of the latter into the intermediate holding means.

The intermediate holding means shaped on site from pourable compound in the zone of connection is joined with the structural element because of its adhesion. For the purpose of reinforcing said connection, the intermediate holding means is preferably glued to the structural element by adding the pourable compound—which is still more or less liquid—to an adhesive applied to the zone of connection. The cured intermediate holding means can then be brought into an actively retaining connection, so that the structural component finally can be easily and simply joined with the structural element.

The intermediate holding element can be cast, for example from a pourable compound. Such pourable compound is in the liquid state while it is being cast.

According to a further development of the invention, provision is made that the intermediate holding means is extruded from a pourable compound. By extruding, for example a pasty pourable compound, i.e. an extrusion compound, it is possible to shape an intermediate holding means and place the latter onto a structural element. Furthermore, no additional mold parts are advantageously needed when the intermediate holding means is extruded for forming the mold for shaping the intermediate holding means.

According to another further development of the invention, rather the structural component and the structural element for a space for receiving the extruded pourable compound as the intermediate holding means is being shaped. Such receiving space is preferably completely formed by the structural component and the structural element. For example, the structural component is attachable to the structural element in the predetermined position, forming at the same time such a receiving space in this way. The receiving space is formed, for example in the form of a cavity, a groove, a deepening or the like, into which the extruded pourable compound is applied or filled for forming the intermediate holding means. The extruded pourable compound is applied or filled by means of an extrusion nozzle which, for example, is designed in the form of a wide-slot nozzle. Such a wide-slot nozzle can be dimensioned in such a way that it moves across and covers the entire receiving space formed by the structural component and the structural element, so that one single movement over said receiving space with simultaneous application of the pourable compound fills the receiving space with the extruded pourable compound, e.g. completely. The extruded pourable compound subsequently cures, forming the intermediate holding means, which then joins the structural component and the structural element with one another. Also, the structural component and the structural element may form such a receiving space for a liquid pourable compound to be cast as well. Said structural elements may be supported in this connection in such a way that the receiving space formed is arranged in such a way that the casting compound poured into said space will not drain from the latter.

The structural component and the structural element may consist of all sorts of different materials such as, for example metal, glass, wood, plastic, or elastomer. Therefore, the method as defined by the invention also offers the advantage that all kinds of different materials can be joined with each other without any problems.

A two-component polyurethane, for example, can be used as the pourable compound, so that the intermediate holding means formed from such a material cures chemically. Also, a single-component polyurethane reacting with moisture is usable as well. However, also other curing materials can be employed, for example those setting through a thermal treatment.

An actively holding connection between the structural component and the intermediate holding means formed from the pourable compound is obtained according to the invention by providing one or several holding elements of the structural component with a shape permitting such holding elements to be joined with the intermediate holding means by clamping, interlocking or the like. For example, as holding elements, usable cavities in the structural component could be filled by pouring or extrusion when the pourable compound is applied, so that upon curing of the intermediate holding means, the latter has been joined with the structural component through interclamping with the latter. Also, pourable compounds can be poured around projections, ledges, noses, ribs and the like present on the structural component, so that such holding elements are received in the cured intermediate holding means and thus clamped as well. Since the finished, its function developing intermediate holding means is glued to the structural element, the structural component and the structural element are finally solidly joined with each other via the extruded or poured intermediate holding means. A mechanical connection exists in this joint between the structural component and the intermediate holding means, which connection, with suitable geometry of the holding elements, also can be detached again, if necessary, namely if either lugs molded on the intermediate holding means can be easily pulled out again from cavities in the structural component, or if projections, feet, ribs and the like holding elements of the structural component, such elements having the pourable compound poured around them, are pulled from the intermediate holding means.

With particular advantage, the method as defined by the invention permits alternative designs for actively retaining connections in that the joint between the structural component and the structural element is either completed or finished following extrusion or pouring of the pourable compound, or in that suitable shapes are formed in the intermediate holding means permitting easy assembly of the structural component and the structural element by bringing the cured intermediate holding means, which is solidly glued to the structural element, into an actively retaining connection with the holding elements on the structural component. For example, locking strips as holding elements can be arrested in undercuts or the like receptacles of the intermediate holding means, such undercuts or the like receptables being adapted to and matching such locking strips in terms of shape, Various corresponding shapes effecting a positive lock are basically applicable for obtaining an actively retaining connection between the structural component and the intermediate holding means.

It is particularly advantageous if a material is used for the pourable compound which has properties that are contrasting the properties of the given structural component upon curing with respect to hardness and elasticity, For example, if the structural component consists of a hard material such as metal or the like, it is advantageous to select for the pourable compound a material which still remains elastic upon curing. The structural components or their holding elements then can be pulled from the intermediate holding means cured from the pourable compound because the leastic material of the latter is capable of deformation. On the other hand, it is advantageous to employ a harder pourable compound if the structural component consists of a soft material, for example an elastomer. When the structural component and the structural element are separated, the holding element of the structural component will then deform because the latter is softer than the intermediate holding means.

The structural component and its holding element are preferably produced jointly in one working step and thereafter joined with the structural element via the intermediate holding means. Preferably moss rubber is used as material for the structural component. Moss rubber has elastic properties which are advantageous in certain cases of application of the connection as defined by the invention. For example, moss rubber is suitable for applications of structural components in the field of sealing technology, where a relatively soft elastomer component, for example, is used as a sealing lip because noise caused by friction and in particular squeaking noise is prevented because of the excellent elasticity. A material harder than moos rubber, for example EPDM is employed as material for the holding element.

Examples of implementation of the method as defined by the invention and particularly various application possibilities of the connection technique as defined by the invention are shown in the drawing, in which.

Figure 1:
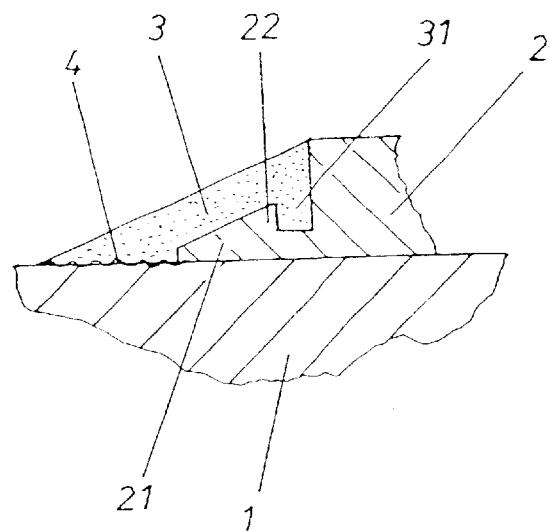
FIG. 1 is a schematic side view of a possibility for producing a connection zone between a structural component and a structural element shown by a sectional view.

FIG. 1 is a schematic sectional side view of a structural component 2 with a structural element 1, showing the zone in which said component and said element are joined. An adhesive 4 is applied to the surface of structural element 2 located in the zone of connection.

Figure 3:
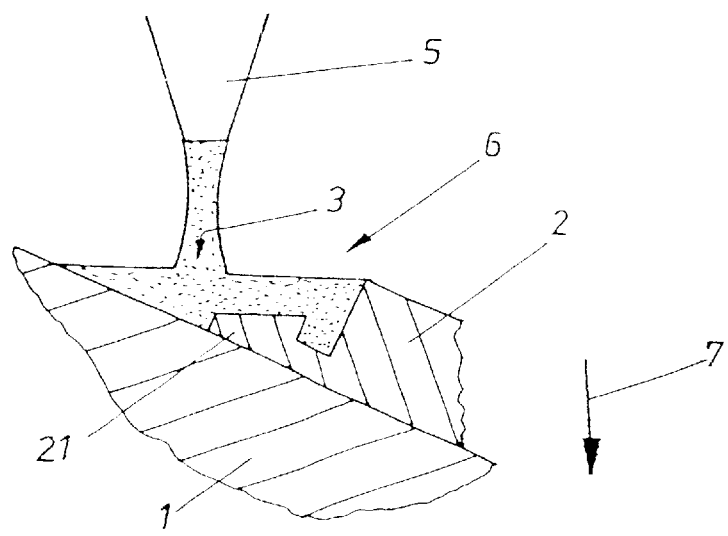
FIG. 3 is a view of the zone of connection according to FIG. 1.

Structural component 2 has a holding element 21, which is designed in the present case in the form of a projecting strip. Curing pourable compound is added to the applied adhesive 4, and at least one intermediate holding means 3 is shaped from said pourable compound, said intermediate holding means being engageable in an actively holding connection with holding element 21 of structural component 2. In the present exemplified embodiment, the liquid, curing pourable compound has first been poured around holding element 21 (FIG. 3), and the latter is received in the intermediate holding means 3 formed by said pourable compound upon curing of the latter. Holding element 21 is shaped in the form of a locking strip and forms a continuation of the segment of structural component 2 which directly and flatly abuts structural element 1. For producing the actively holding connection between structural element 1 and structural component 2, said holding element 21 is surrounded by intermediate holding means 3 only on one side. The actively holding connection is produced in that holding element 21 has a projection 22 forming an undercut on its side facing away from structural element 1, with one edge of said projection being engaged from behind by an angled segment 31 of intermediate holding means 3.

Figure 2:
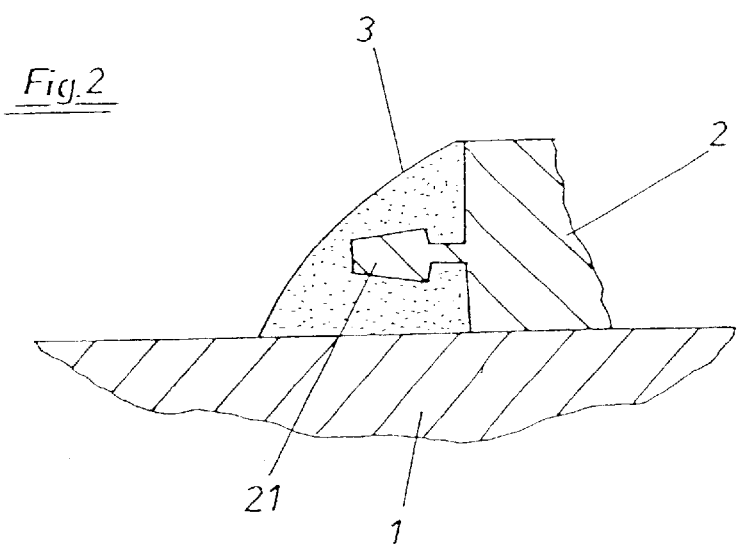
FIG. 2 is a schematic sectional side view of another possibility for producing a zone of connection between a structural component and a structural element.

FIG. 2 shows a possibility for producing a zone of connection deviating from the above design. Here, too, holding element 21 is formed as a through-extending locking strip projecting from structural component 2. However, said holding element 21 is not directly abutting structural element 1. In FIG. 2, holding element 21 is surrounded on all sides by the pourable compound of intermediate holding means 3, and an actively retaining connection is producible in this way as well.

FIG. 3 again shows the zone of connection according to FIG. 1, namely in the course of production of intermediate holding means 3. Intermediate holding means 3 is produced by casting. For this purpose, the liquid pourable compound is ejected by a nozzle 5 and poured into a receiving space 6. Receiving space 6 is substantially shaped in the form of a groove and completely formed in this case by the surfaces of structural element 1 forming said groove and the surfaces of structural component 2, with inclusion of the holding element 21 of the latter. Receiving space 6 is completely filled with the liquid pourable compound, as this is shown in FIG.

3. Receiving space 6 is filled here with the pourable compound in such a way that the intermediate holding means 3 is finally formed in terms of its shape. Thereafter, the pourable compound is cured. For optimally filling the receiving space 6, structural element 1 and with it structural component 2 can be tilted about a tilting axis exiting vertically from the plane of the drawing, as shown by arrow 7 in FIG. 3. Through such tilting, receiving space 6 is arranged in relation to nozzle 5 in such a way that receiving space 6 can be completely filled with the pourable compound without any overflow of the pourable compound over the edges of receiving space 6 especially within the zone of structural component 2. No other prefabricated molded elements are needed in addition to structural element 1 and structural component 2 for forming the intermediate holding means 3, which is advantageous.

Figure 4:
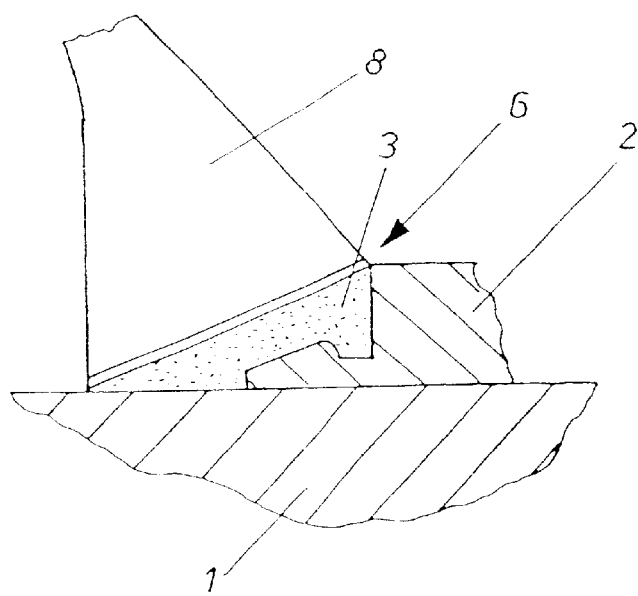
FIG. 4 is a further view of the zone of connection according to FIG. 1.

FIG. 4 shows the filling of cavity 6 with an extruded pourable compound. However, structural element 1 is not tilted here about an axis but aligned horizontally because the pourable compound is not liquid, but pasty. However, as opposed to the representation in FIG. 3, an extruding tool is employed in the present case, namely a wide-slot nozzle 8. Wide-slot nozzle 8 is designed in such a way that it just sweeps the hypotenuse of receiving space 6 which, sectionally viewed, has a triangular shape, thus filling receiving space 6 with extruded pourable compound as it moves across said space in a movement parallel with the longitudinal expanse of said space. In the present case, the pourable compound so applied subsequently cures as well, forming the intermediate holding means 3.

Figure 5:
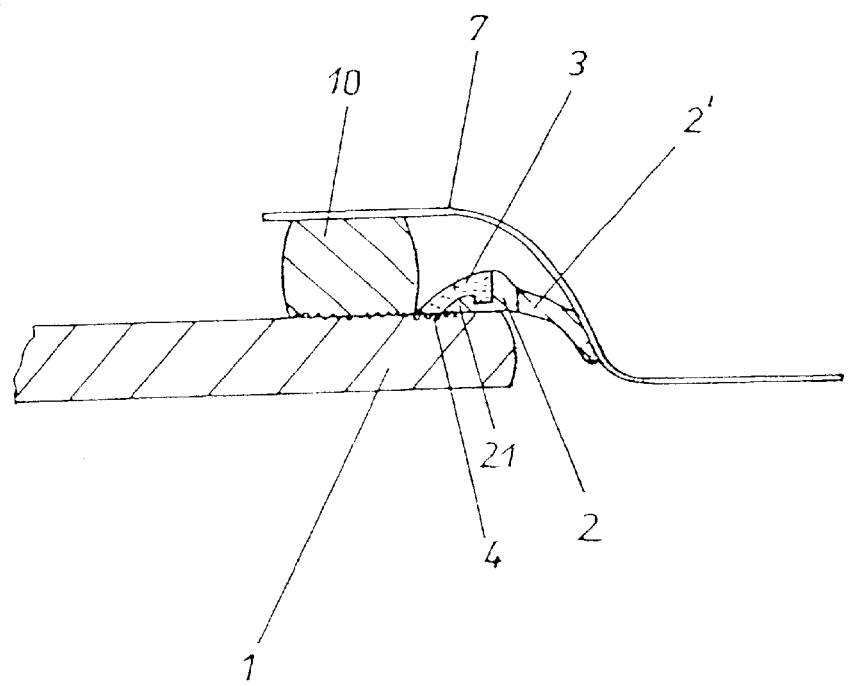
FIG. 5 is a schematic sectional view of an application of a connection of a structural element present in the form of an automobile windowpane, with a structural component with a sealing lip corresponding with FIG. 1, whereby the windowpane is secured with an installation adhesive on a car body flange indicating the body of an automobile.

FIG. 5 shows a schematic sectional view of an application for producing a connection between a structural element 1, which is present in the form of an automobile windowpane, with a structural component 2 having a sealing lip 2', whereby structural element 2 present as a windowpane is secured on a flange 7 of an auto body with an installation adhesive 10. Said adhesive applied in the region of the connection is again denoted by reference numeral 4 and, in the present case, serves for both gluing intermediate holding means 3 consisting of pourable compound, to the glass pane (structural element 1), and installation adhesive 10 with said glass pane. Structural component 2 and holding element 21 are produced from a hard material, e.g. EDPM, whereas sealinglip 21 is produced from a softer material such as moss rubber. The harder material of structural component 2 and holding element 21 serves for forming a mechanically solid connection with intermediate holding means 3, whereas the soft sealing lip 2' is capable of closely abutting body flange 7.

Figure 6:
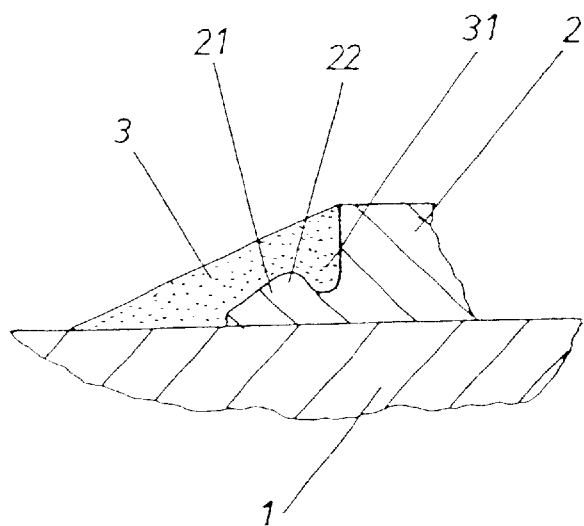
FIG. 6 is a schematic side view of another possibility for producing a zone of connection between a structural component and a structural element shown by a sectional view.
Figure 7:
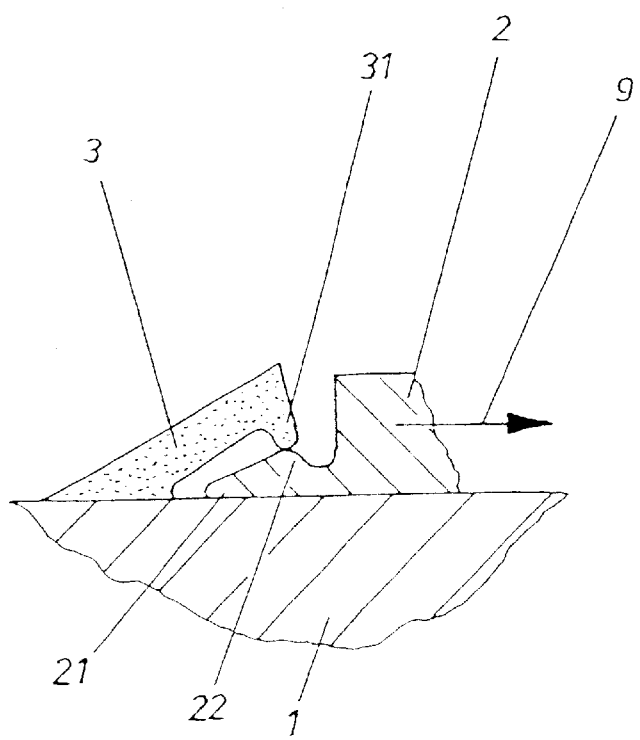
FIG. 7 is another side view of the possibility for producing a zone of connection according to FIG. 6.

The possibility for producing the connection zone in FIGS. 6 and 7 substantially corresponds with the possibility shown in FIG. 1. However, in FIGS. 6 and 7, holding element 21 of structural component 2 has a projection 22 with a rounded edge. Segment 31 of intermediate holding means 3, said segment engaging projection 22 from behind, is rounded as well. Said roundings make it possible to easily detach structural component 2 again from structural element 1 by pulling it out of intermediate holding means 3. Therefore, structural component 2 is replaceable, for example when it is designed as a sealing section which needs to be replaced after a longer time of use. Arrow 9 in FIG. 7 indicates how structural component 2 is pulled from intermediate holding means 3. Arrow 9 symbolizes the force to be applied for pulling structural component 2 out of intermediate holding means 3. In this process, segment 31 of the intermediate holding means is guided across projection 22 of the holding element as shown in FIG. 7. Intermediate holding means elastically swells in this process by the height of projection 22. For this purpose, intermediate holding means 3 is produced from a pourable compound curing into an leastic material.

What is claimed is:
1. A method for producing a detachable connection between a structural component, having at least one holding element, and a structural element, the holding element having a projection forming an undercut on a side facing away from the structural element, the method comprising the steps of:
  applying an adhesive to a surface of said structural element;
  applying an elastic pourable compound to a surface of said holding element and to said structural element in a region of said adhesive which form a receiving area shaped as an open groove;
  curing said pourable compound in said open groove wherein said elastic pourable compound remains elastic even after said compound cures, and said elastic pourable compound forms a holding meand via casting, forming an angled segment for locking with the undercut of the projection of the holding element, which forms a positive lock between said structural component and said structural element; and
  selectively detaching said holding means from a connection with said structural component so that said structural element can be detached from said structural component.

2. The method according to claim 1, wherein the structural component is placed against the structural element in a predetermined position and, wherein said structural component and said structural element form the shape of said holding means.

3. The method according to claim 1, further comprising the step of producing the structural component and the holding element jointly in at least one working step, and subsequently joining the structural element with the structural component and the holding element via said holding means.

4. The method according to claim 3, wherein said structural component is made from moss rubber and wherein said holding element is made from EPDM.

5. A method for producing a detachable connection between a structural component, having at least one holding element, and a structural element, the holding element having a projection forming an undercut on a side facing away from the structural element comprising the steps of:
  applying an adhesive to a surface of said structural element;
  applying an elastic pourable compound to a surface of said holding element and to said structural element in a region of said adhesive which form a receiving area shaped as an open groove;
  curing said pourable compound in said open groove wherein said elastic pourable compound remains elastic even after said compound cures, and said elastic pourable compound forms a holding means via extruding, forming an angled segment for locking with an undercut of the projection of the holding element to form a positive lock between said structural component and said structural element; and
  selectively detaching said holding means from said positive lock so that said structure element can be detached from said structural component.

* * * * *